(12) United States Patent
Tsai et al.

(10) Patent No.: US 7,961,787 B2
(45) Date of Patent: Jun. 14, 2011

(54) METHOD OF VIDEO CONTENT COMPLEXITY ESTIMATION, SCENE CHANGE DETECTION AND VIDEO ENCODING

(75) Inventors: Chun-Jen Tsai, Fongyuan (TW); Ching-Ho Chen, Kaohsiung (TW)

(73) Assignee: Novatek Microelectronics Corp., Hsinchu (TW)

( * ) Notice: Subject to any disclaimer, the term of this patent is extended or adjusted under 35 U.S.C. 154(b) by 1580 days.

(21) Appl. No.: 11/302,735

(22) Filed: Dec. 13, 2005

(65) Prior Publication Data
US 2006/0262849 A1 Nov. 23, 2006

(30) Foreign Application Priority Data

May 20, 2005 (TW) .................................. 94116444 A

(51) Int. Cl.
*H04N 7/12* (2006.01)
(52) U.S. Cl. .............. 375/240.12; 375/240.13; 375/240; 382/173; 382/239; 382/232; 382/238
(58) Field of Classification Search ............ 375/240.03, 375/240.07, 240.13, 240.12; 382/239, 232, 382/238, 173
See application file for complete search history.

(56) References Cited

U.S. PATENT DOCUMENTS

| | | | | |
|---|---|---|---|---|
| 2002/0159521 A1* | 10/2002 | Yan et al. | .................. | 375/240.03 |
| 2003/0039308 A1* | 2/2003 | Wu et al. | .................. | 375/240.12 |
| 2004/0091045 A1* | 5/2004 | Chang et al. | ............. | 375/240.03 |
| 2007/0147512 A1* | 6/2007 | Eckart | ...................... | 375/240.24 |

* cited by examiner

*Primary Examiner* — Benny Q Tieu
*Assistant Examiner* — Paul F Payer
(74) *Attorney, Agent, or Firm* — J.C. Patents

(57) ABSTRACT

Methods of video content complexity estimation, scene change detection and video encoding are provided. The video content complexity estimation and the scene change detecting are performed before a video encoding loop is processed. The method of video content complexity estimation includes calculating an absolute difference value $diff_i$ of the $i^{th}$ pixel between a current frame and a reference frame, a mean value mean(R) of pixel region R, a deviation value deviation(R) of pixel region R, a complexity value X of a target frame and an adjusted complexity $\hat{C}_{target}$ of the target frame by using equations $$\text{mean}(R) = \frac{1}{NM}\sum_{i \in R} diff_i,$$

$$\text{deviation}(R) = \sum_{i \in R} \text{abs}(diff_i - \text{mean}(R)),$$

$$X = \sum_{R \in frame} \text{mean}(R) \cdot \text{deviation}(R)$$

and $\hat{C}_{target} = a \cdot X/b$, respectively. Wherein, R represents N*M pixel region, $a=b \cdot SAD_{target}/X$, b is power of 2 and $SAD_{target}$ represents a true motion compensation sum of absolute difference for the target frame.

16 Claims, 4 Drawing Sheets

METHOD OF VIDEO CONTENT COMPLEXITY ESTIMATION, SCENE CHANGE DETECTION AND VIDEO ENCODING

CROSS-REFERENCE TO RELATED APPLICATION

This application claims the priority benefit of Taiwan application serial no. 94116444, filed on May 20, 2005. All disclosure of the Taiwan application is incorporated herein by reference.

BACKGROUND OF THE INVENTION

1. Field of the Invention

This invention generally relates to a method of video encoding, and especially to a method of video content complexity estimation and scene change detection.

2. Description of Related Art

Digital video usually contains a huge number of data. In order to save transmission bandwidth when transmitting video data, or to save storage space when storing video data, a video data must be compressed. The data compression is generally to remove surplus data from the video data for the purpose of reducing data. For example, when a previous frame is similar to the next frame, the first frame is kept and the like parts in the following frames are removed; that is, only the different parts are retained. Therefore, the amount of digital video data can be substantially reduced. For example, MPEG video compression standard is a popular video encoding method.

FIG. 1 is a schematic drawing of a conventional video encoding method. As shown in FIG. 1, motion estimation 110 compares digital video data DATA with reference frame data RF, and outputs motion estimation result 111. The conventional video content complexity estimation and the scene change detection 120 use the motion estimation result 111 to perform estimation and detection. According to the motion estimation result 111, motion compensation 130 compensates the received reference frame data RF and generates a compensation data 131. Transform coding 140 and quantization 150 can be performed after the digital video data DATA subtracts the compensation data 131, and further a quantized data 151 is generated. Further, according to the motion estimation result 112 and the quantized data 151, entropy coding 160, which is for example variable length coding, is performed, and a digital video data OUT which has been completely compressed is generated.

The above-mentioned reference frame data RF generally is a data 181 which is obtained after inverse-quatization 170 and inverse-transform coding 180 are performed to the quantized data 151. The reference frame data RF is obtained after a compensation data 132 is added to the data 181.

When digital video is applied at different environments, the different transmission and storage characteristics require a distinct encoding process. Especially, most transmission systems are constant bit rate (CBR) transmission. In order to maintain the CBR at video encoding process, most encoding devices must be equipped with a rate control module. In any rate control module, an important core element, video content complexity estimation device, must be included. A conventional rate control module performs the video content complexity estimation in a frame encoding loop (i.e. after motion estimation 110 as shown in FIG. 1). Generally speaking, in a video encoding device on a system on chip (SoC) platform, the video content complexity estimation is performed on MCU, and video-encoding loop (i.e. motion estimation, transform, quatization and entropy encoding) is performed on ASIC accelerator core. However, in the conventional technology, because the complexity estimation must be performed after the motion estimation is accomplished, data is frequently transmitted between the MCU and the ASIC calculation cores. In other words, a lot of time is spent on communication between the MCU and the ASIC calculation cores, and therefore the video encoding efficiency is decreased.

SUMMARY OF THE INVENTION

An object of the present invention is to provide a method of video content complexity estimation, which utilizes original video data followed by a video encoding loop process, for performing the complexity estimation of a P-frame.

An object of the present invention is to provide a method of video content complexity estimation, which utilizes original video data followed by a video encoding loop process, for performing the complexity estimation of an I-frame.

An object of the present invention is to provide a method of scene change detection, which utilizes original video data followed by a video encoding loop process, for performing the scene change detection.

An object of the present invention is to provide a method of video encoding, which utilizes original video data followed by a video encoding loop process, for performing the video encoding rate control.

The present invention provides a method of video content complexity estimation, for calculating the complexity of the P-frame. The method of video content complexity estimation is described as follows. First, $diff_i$ is calculated, wherein $diff_i$ represents an absolute difference value of $i^{th}$ pixel between a current frame and a reference frame, wherein i is an integer. Further $$\text{mean }(R) = \frac{1}{NM} \sum_{i \in R} diff_i$$

is calculated, wherein R represents N×M pixel region, mean (R) represents a mean value of the pixel region R. Further, $$\text{deviation }(R) = \sum_{i \in R} \text{abs}(diff_i - \text{mean }(R))$$

is calculated, wherein deviation(R) represents an deviation value of the pixel region R, abs( ) represents an absolute value. Furthermore, $$X = \sum_{R \in frame} \text{mean}(R) \cdot \text{deviation}(R)$$

is calculated, wherein X represents a complexity estimation of a target frame. Finally, $\tilde{C}_{target} = a \cdot X/b$ is calculated, wherein target $\tilde{C}_{target}$ represents an adjusted complexity of the target frame, a is an integer and b is power of 2. Further, a is calculated again by a formulation $a = b \cdot SAD_{target}/X$ after each frame is encoded, wherein $SAD_{target}$ represents a true motion compensated sum of absolute difference value of the target frame.

The present invention provides another method of video content complexity estimation, for calculating the complexity of the I-frame. The method of video content complexity estimation is described as follows. First, $$\text{mean}(R) = \frac{1}{NM} \sum_{i \in R} luma_i$$

is calculated, wherein R represents N×M pixel region, mean (R) represents a mean value of the pixel region R, and $luma_i$ represents a luminance intensity of $i^{th}$ pixel, and i is an integer. Further, $$\text{deviation}(R) = \sum_{i \in R} \text{abs}(luma_i - \text{mean}(R))$$

is calculated, wherein deviation(R) represents a deviation value of the pixel region R, abs( ) represents an absolute value. Further, $$X_I = \sum_{R \in frame} \text{mean}(R) \cdot \text{deviation}(R)$$

is calculated, wherein $X_I$ represents a complexity estimation of the target I-frame. Finally, $\hat{C}_{target} = a_I X_I/b$ is calculated, wherein $\hat{C}_{target}$ represents an adjusted complexity of the target I-frame, $a_I$ is integer and b is power of 2. Further, $a_I$ is calculated again by a formulation $a_I' = a_I R_{target}/R_{true}$ after the target I-frame is encoded, wherein $a_I'$ represents $a_I$ of the next target I-frame, $R_{target}$ represents a size of the target I-frame, $R_{true}$ represents a true size of the target I-frame. Wherein, the target I-frame is accomplished by utilizing $D_{target}$ for encoding, and $D_{target}$ represents a distortion value of the target frame.

The present invention provides a method of scene change detection, which comprises the following steps. First, $diff_i$ is calculated, wherein $diff_i$ represents a frame absolute difference of $i^{th}$ pixel between a current frame and a reference frame, wherein i is an integer. Further, $$\text{mean}(R) = \frac{1}{NM} \sum_{i \in R} diff_i$$

is calculated, wherein R represents N×M pixel region, mean (R) represents a mean value of the pixel region R. Further, $$\text{deviation}(R) = \sum_{i \in R} \text{abs}(diff_i - \text{mean}(R))$$

is calculated, wherein deviation(R) represents a deviation value of the pixel region R, abs( ) represents an absolute value. Finally, $$X = \sum_{R \in frame} \text{mean}(R) \cdot \text{deviation}(R)$$

is calculated, wherein X represents a complexity estimation of a target frame. When X is greater than a critical value, the target frame is a scene change frame. Wherein, after calculating multi X values, the critical value is decided by selecting the minimum value from the multiple X values.

The present invention provides a method of video encoding, which comprises the following steps. First, original video data are provided. Further, video content complexity estimation and scene change detection are performed to the original video data. Further, a video encoding rate control is performed according to the results of the video content complexity estimation and the scene change detection. Finally, an encoding loop calculation is performed to the original video data according to a result of the video encoding rate control.

In accordance with the method of video encoding of the embodiment of the present invention, the video encoding loop calculation comprises motion estimation, transform, quatization and entropy encoding. For example, MPEG dynamic video compression standard is utilized for the video encoding loop calculation.

In the present invention, before the video encoding loop is performed, the rate control mechanism is performed according to the original video data, including the video content complexity estimation and scene change detection. In this way, the communication requirement between the MCU and the ASIC calculation cores are reduced, and thus the video encoding efficiency is increased.

The above is a brief description of some deficiencies in the prior art and advantages of the present invention. Other features, advantages and embodiments of the invention will be apparent to those skilled in the art from the following description, accompanying drawings and appended claims.

DESCRIPTION OF THE EMBODIMENTS

Figure 1:
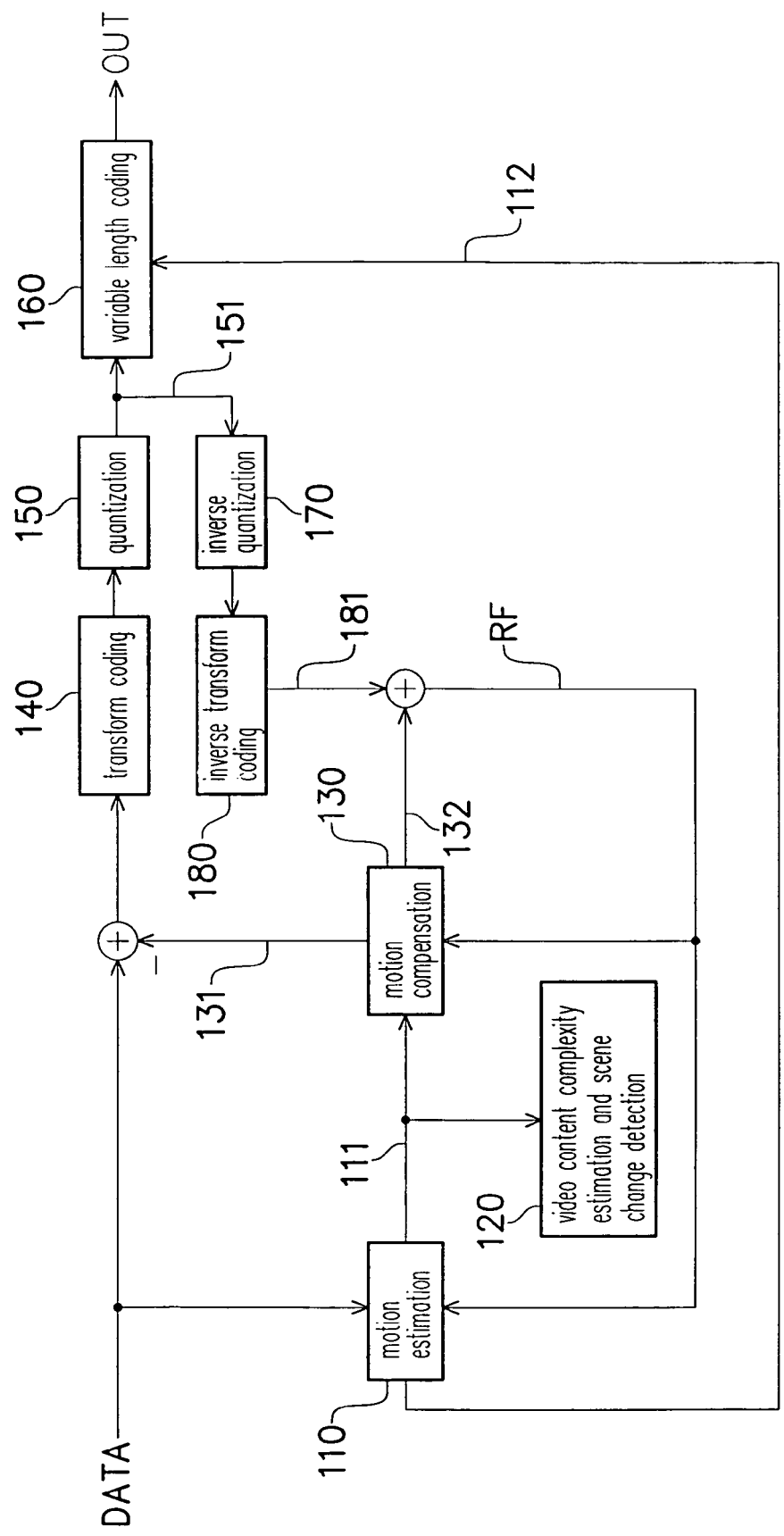
FIG. 1 is a schematic drawing of a conventional video encoding method.
Figure 2:
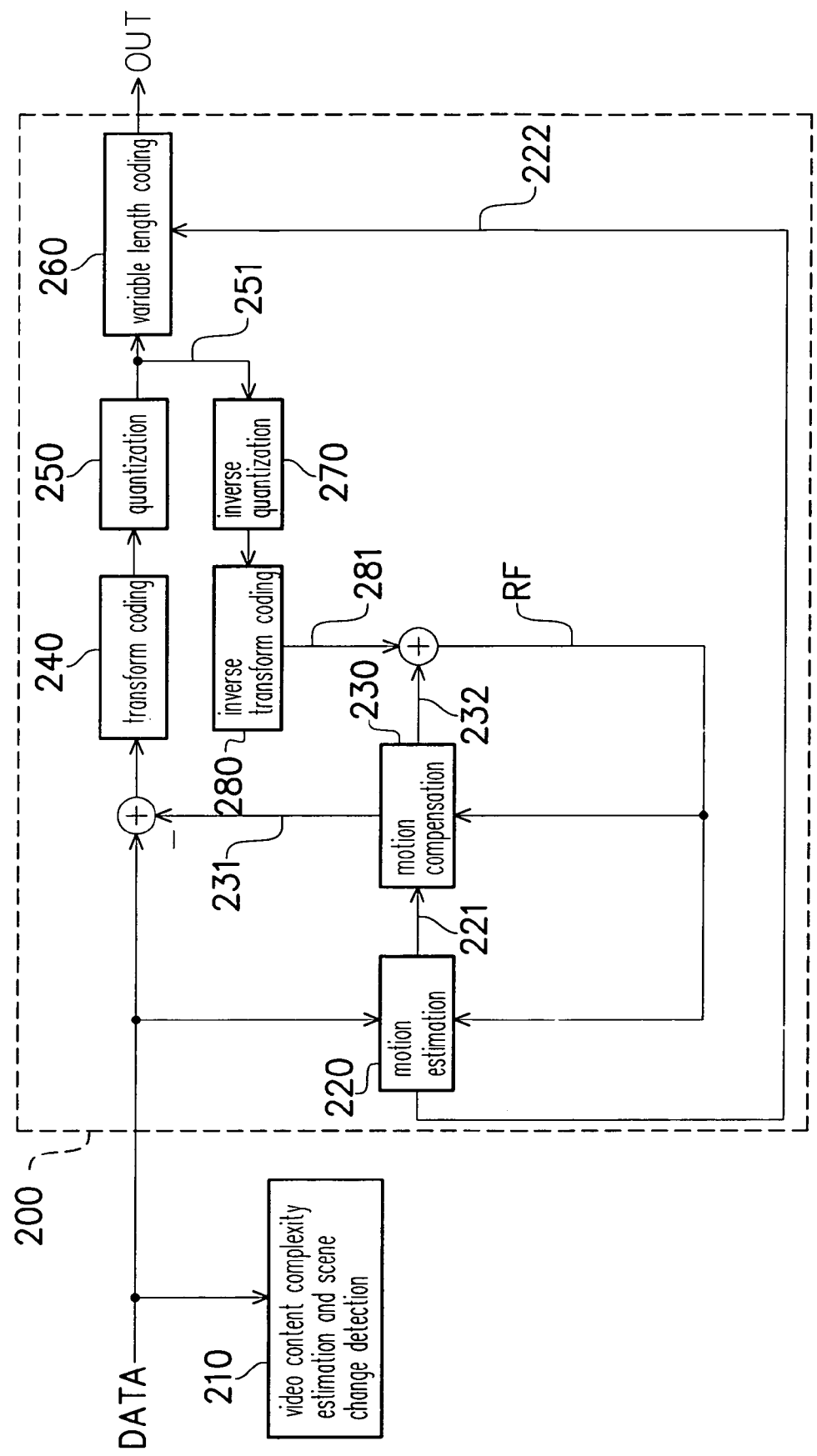
FIG. 2 is a schematic drawing of a video encoding method according to an embodiment of the present invention.

FIG. 2 is a schematic drawing of video encoding method according to an embodiment of the present invention. As shown in FIG. 2, the important core calculation of the rate control function, video content complexity estimation and scene change detection 210, receives original video data DATA. In the conventional technology, the complexity estimation must be performed after accomplishing the motion estimation. In the present invention, the embodiment of the present invention performs the video content complexity estimation and scene change detection 210 outside the video encoding loop 200. In general, the video content complexity estimation and scene change detection 210 are performed in the MCU core, and the video encoding loop 200 are performed in the ASIC calculation core, therefore the present invention is specially suitable for the structure of system on chip (SoC).

As shown in FIG. 2, in the video encoding loop 200, the motion estimation 220 compares the video data DATA with a reference frame data RF, and outputs a motion estimation result 221. According to a motion estimation result 221, motion compensation 230 compensates the received reference frame data RF and creates a compensation data 231. After the video data DATA subtracts the compensation data 231, transform coding 240 and quantization 250 can be performed, and a quantized data 251 is generated. Further, According to the motion estimation result 222 and the quantized data 251, entropy coding 260 is performed, and finally a compressed video data OUT is generated.

In order to reconstruct the reference frame data RF, in general, inverse quantization 270 and inverse transform coding 280 are performed to the quantized data 251, and data 281 is obtained. Further, the reference frame data RF is obtained after the data 281 is added with a compensation data 232.

Figure 3:
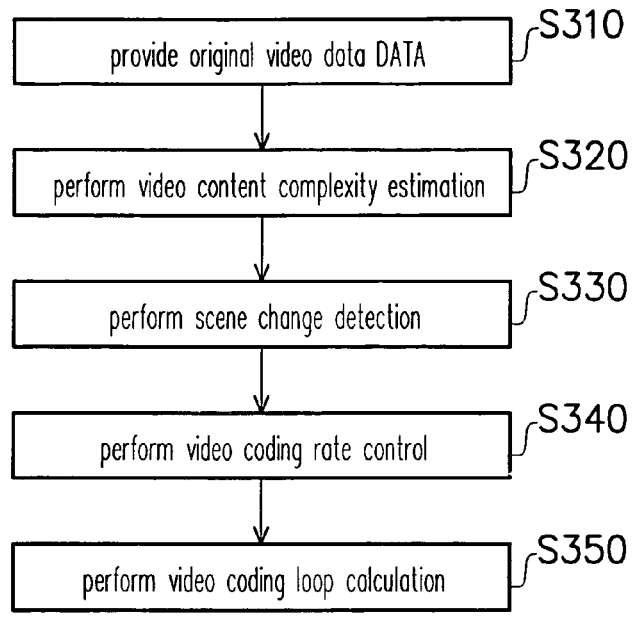
FIG. 3 is a flow chart of video encoding method according to an embodiment of the present invention.

FIG. 3 is a flow chart of video encoding method according to an embodiment of the present invention. As shown in FIG. 2 and FIG. 3, the original data DATA is provided at the step S310. Further, the video content complexity estimation at the step S320 and the scene change detection at the step S330 are performed to the original data DATA, as shown in 210 of FIG. 2. Further, according to the results at the step S320 and the step S330, video encoding rate control is performed at the step S340. At the step S350, according to the video encoding rate control at the step S340, encoding loop calculation 200 is performed to the original data DATA.

Figure 4:
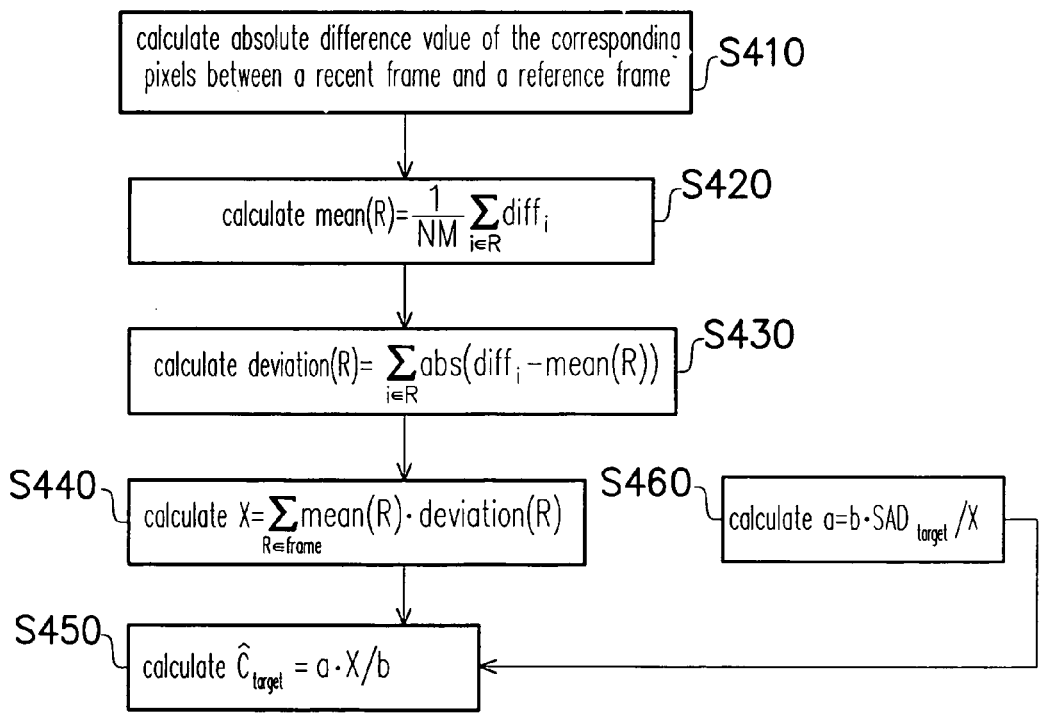
FIG. 4 is a flow chart of video content complexity estimation in P-frame according to an embodiment of the present invention.

In the above-mentioned embodiment, the step S320 can be performed in accordance with FIG. 4. FIG. 4 is a flow chart of video content complexity estimation in P-frame according to an embodiment of the present invention. When calculating the video content complexity estimation in the P-frame, an absolute difference value $diff_i$ of the corresponding pixels between a recent frame and a reference frame is calculated at the step S410. Wherein $diff_i$ represents an absolute difference value of $i^{th}$ pixel, and i is an integer. At the step S420, a mean value of a pixel region R $$\text{mean}(R) = \frac{1}{NM} \sum_{i \in R} diff_i$$

is calculated, wherein R represents N×M pixel region.

At the step S430, a deviation value of the pixel region R $$\text{deviation}(R) = \sum_{i \in R} \text{abs}(diff_i - \text{mean}(R))$$

is calculated, wherein abs( ) represents an absolute value. Further, at the step S440, a complexity estimation of a target frame X is calculated in accordance with a formula $$X = \sum_{R \in frame} \text{mean}(R) \cdot \text{deviation}(R).$$

At the step S450, an adjusted complexity of the target frame $\hat{C}_{target}=a \cdot X/b$ is calculated, wherein, a is an integer that is generated after calculating the previous frame at the step S460, for example, and b is power of 2, for example, $2^{16}$. Finally, after each frame is encoded, at the step S460, $a=b \cdot SAD_{target}/X$ is calculated again for next frame, wherein $SAD_{target}$ represents a true motion compensated sum of absolute difference value for the target frame.

Figure 5:
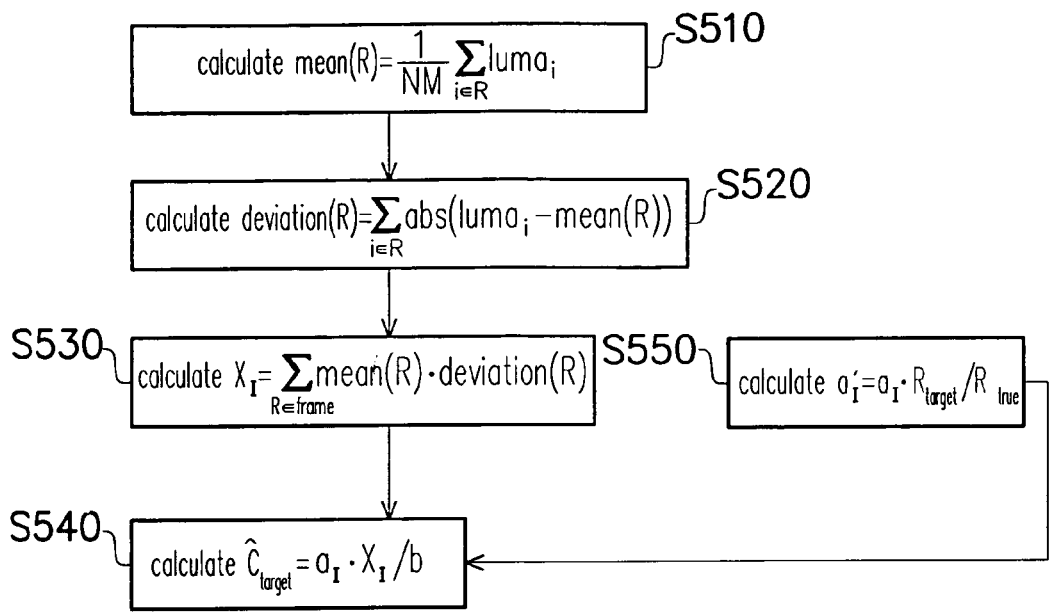
FIG. 5 is a flow chart of video content complexity estimation in I-frame according to an embodiment of the present invention.

When the recent frame is I-frame, the above-mentioned step S320 as shown in FIG. 3 can be performed in accordance with FIG. 5. FIG. 5 is a flow chart of video content complexity estimation in I-frame according to an embodiment of the present invention. Because the I-frame does not have a reference frame, a luminance mean value of the pixel region R $$\text{mean}(R) = \frac{1}{NM} \sum_{i \in R} luma_i$$

is calculated at the step S510, wherein R represents N×M pixel region, and $luma_i$ represents a luminance intensity of $i^{th}$ pixel, wherein i is an integer. Further, a deviation value of the pixel region R $$\text{deviation}(R) = \sum_{i \in R} \text{abs}(luma_i - \text{mean}(R))$$

is calculated at the step S520, wherein abs( ) represents an absolute value.

Further, a complexity estimation of a target I-frame $$X_I = \sum_{R \in frame} \text{mean}(R) \cdot \text{deviation}(R)$$

is calculated at the step S530. At the step S540, $\hat{C}_{target}=a_I \cdot X_I/b$, is calculated, wherein $a_I$ is integer which is generated after calculating a previous frame at the step S550, for example, and b is power of 2, for example, $2^{16}$. After the target I-frame is encoded, $a_I'=a_I R_{target}/R_{true}$ is calculated again at the step S550, wherein $a_I'$ represents $a_I$ of next target I-frame, $R_{target}$ represents a size of the target I-frame, $R_{true}$ represents a true size of the target I-frame. In the embodiment of the present invention, the above-mentioned target I-frame is accomplished by utilizing $D_{target}$ for encoding, and $D_{target}$ represents a distortion value of the target frame.

Figure 6:
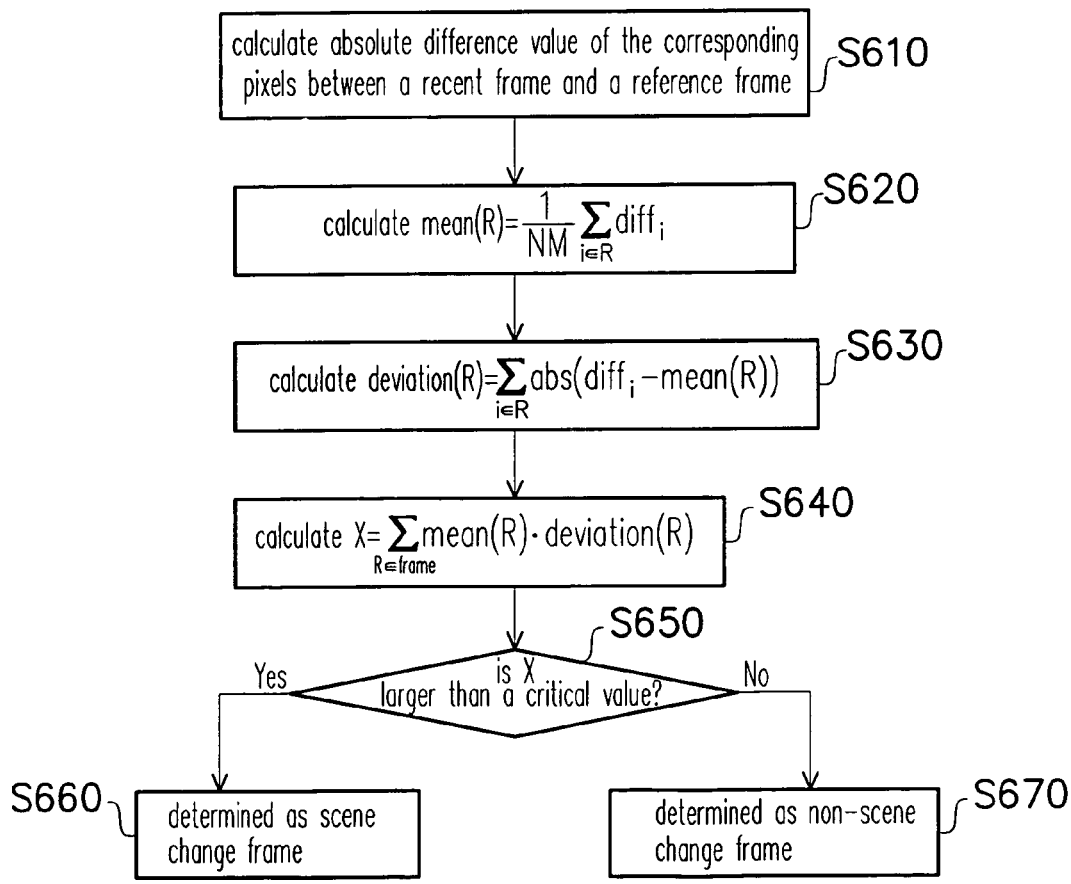
FIG. 6 is a flow chart of scene change detection method according to an embodiment of the present invention.

Further, the above-mentioned step S330 in FIG. 3 can be implemented in accordance with FIG. 6. FIG. 6 is a flow chart of scene change detection method according to an embodiment of the present invention. As shown in FIG. 6, the steps S610 to S640 are the same as the steps S410 to S440 in FIG. 4, so they are not described here. At the step S650, the complexity estimation of a target P-frame X is compared with a critical value, when the complexity X is larger than the critical value, the target frame is judged as the scene change frame at the step S660; otherwise, as a non-scene change frame at the step S670. Wherein, the critical value can be decided by selecting the minimum value from the multiple X values. In the embodiment of the present invention, the critical value is, for example, 12,000,000×(γ/25344), wherein γ represents total pixel amount of a frame.

The above description provides a full and complete description of the preferred embodiments of the present invention. Various modifications, alternate construction, and equivalent may be made by those skilled in the art without changing the scope or spirit of the invention. Accordingly, the above description and illustrations should not be construed as limiting the scope of the invention, which is defined by the following claims.

What is claimed is:

1. A method of video content complexity estimation for calculating complexity of a P-frame, wherein the method of the video content complexity estimation comprises:

calculating, in a system on chip, $diff_i$, wherein $diff_i$ represents an absolute difference between a current frame and a reference frame, and i is an integer calculating $$mean(R) = \frac{1}{NM} \sum_{i \in R} diff_i,$$

wherein R represents N×M pixel region, mean(R) represents a mean value of the pixel region R;

calculating $$deviation(R) = \sum_{i \in R} abs(diff_i - mean(R)),$$

wherein deviation(R) represents a deviation value of the pixel region R, abs( ) represents a absolute value;

calculating $$X = \sum_{R \in frame} mean(R) \cdot deviation(R),$$

wherein X represents a complexity estimation of a target frame;

calculating $\hat{C}_{target} = a \cdot X/b$, wherein $\hat{C}_{target}$ represents an adjusted complexity of the target frame, a is integer and b is power of 2; and calculating $a = b \cdot SAD_{target}/X$ after each frame is encoded, wherein $SAD_{target}$ represents a true motion compensated sum of absolute difference value for the target frame.

2. A method of video content complexity estimation for calculating complexity of an I-frame, wherein the method of the video content complexity estimation comprises:

calculating, in a system on chip, $$mean(R) = \frac{1}{NM} \sum_{i \in R} luma_i,$$

wherein R represents a N×M pixel region, mean(R) represents a mean value of the pixel region R, and $luma_i$ represents a luminance intensity of $i^{th}$ pixel, and i is an integer;

calculating $$deviation(R) = \sum_{i \in R} abs(luma_i - mean(R)),$$

wherein deviation(R) represents a deviation value of the pixel region R, abs( ) represents an absolute value;

calculating $$X_I = \sum_{R \in frame} mean(R) \cdot deviation(R),$$

wherein $X_I$ represents a complexity of the target I-frame, $a_I$ is integer and b is power of 2; and calculating $a_I' = a_I \cdot R_{target}/R_{true}$ after the target I-frame encoding, wherein $a_I'$ represents $a_I$ of next target I-frame, $R_{target}$ represents a size of the target I-frame, $R_{true}$ represents a true size of the target I-frame.

3. The method of video content complexity estimation of claim 2, wherein the target I-frame is encoded by utilizing $D_{target}$ for encoding, and $D_{target}$ represents a distortion value of the target frame.

4. A method of scene change detection comprising:

calculating, in a system on chip, $diff_i$, wherein $diff_i$ represents an absolute difference value of j pixel between a current frame and a reference frame, and i is an integer;

calculating $$mean(R) = \frac{1}{NM} \sum_{i \in R} diff_i,$$

wherein R represents N×M pixel region, mean(R) represents a mean value of the pixel region R;

calculating $$deviation(R) = \sum_{i \in R} abs(diff_i - mean(R)),$$

wherein deviation(R) represents a deviation value of the pixel region R, abs( ) represents a absolute value;

calculating $$X = \sum_{R \in frame} mean(R) \cdot deviation(R),$$

wherein X represents a complexity estimation of a target frame; and when X is greater than a critical value, the target frame is a scene change frame.

5. The method of scene change detection of claim 4, wherein after calculating multiple X values, the minimum value is selected from the multiple X values for deciding the critical value.

6. A method of video encoding comprising the steps of:

providing an original video data;

performing a video content complexity estimation to the original video data in a P-frame, wherein the steps of performing the video content complexity estimation to the original video data in P-frame comprise:

calculating, in a system on chip, $diff_i$, wherein $diff_i$ represents an absolute difference between a current frame and a reference frame, and i is an integer calculating $$\text{mean}(R) = \frac{1}{NM} \sum_{i \in R} \text{diff}_i,$$

wherein R represents N×M pixel region, mean(R) represents a mean value of the pixel region R;
calculating $$\text{deviation}(R) = \sum_{i \in R} \text{abs}(\text{diff}_i - \text{mean}(R)),$$

wherein deviation(R) represents a deviation value of the pixel region R, abs( ) represents a absolute value;
calculating $$X = \sum_{R \in \text{frame}} \text{mean}(R) \cdot \text{deviation}(R),$$

wherein X represents a complexity estimation of a target frame;
calculating $\hat{C}_{target} = a \cdot X/b$, wherein $\hat{C}_{target}$ represents an adjusted complexity of the target frame, a is integer and b is power of 2; and
calculating $a = b \cdot SAD_{target}/X$ after each frame is encoded, wherein $SAD_{target}$ represents a true motion compensated sum of absolute difference value for the target frame;
performing a scene change detection to the original video data;
performing a video encoding rate control according to results of the video content complexity estimation and the scene change detection; and
performing a encoding loop calculation to the original video data according to a result of the video encoding rate control.

7. The method of video encoding of claim 6, wherein steps of performing the scene change detection to the original video data comprise:
calculating $\text{diff}_i$, wherein $\text{diff}_i$ represents an absolute difference value of $i^{th}$ pixel between a current frame and a reference frame in the original video data, and i is an integer;
calculating $$\text{mean}(R) = \frac{1}{NM} \sum_{i \in R} \text{diff}_i,$$

wherein R represents N×M pixel region, mean(R) represents a mean value of the pixel region R;
calculating $$\text{deviation}(R) = \sum_{i \in R} \text{abs}(\text{diff}_i - \text{mean}(R)),$$

wherein deviation(R) represents a deviation value of the pixel region R, abs( ) represents an absolute value;
calculating $$X = \sum_{R \in \text{frame}} \text{mean}(R) \cdot \text{deviation}(R),$$

wherein X represents a complexity estimation of a target frame; and
when X is greater than a critical value, the target frame is a scene change frame.

8. The method of video encoding of claim 7, wherein after calculating multiple X values, the minimum value is selected from the multiple X values for deciding the critical value.

9. The method of video encoding of claim 6, wherein the video encoding loop calculation comprises motion estimation, transform, quantization and entropy encoding.

10. The method of video encoding of claim 6, wherein MPEG dynamic video compression standard is utilized for the video encoding loop calculation.

11. A method of video encoding comprising the steps of:
providing an original video data;
performing a video content complexity estimation to the original video data in I-frame, wherein steps of performing the video content complexity estimation to the original video data in I-frame comprise:
calculating, in a system on chip, $$\text{mean}(R) = \frac{1}{NM} \sum_{i \in R} \text{luma}_i,$$

wherein R represents a N×M pixel region,
mean(R) represents a mean value of the pixel region R, and $\text{luma}_i$ represents a luminance intensity of $i^{th}$ pixel, and i is an integer;
calculating $$\text{deviation}(R) = \sum_{i \in R} \text{abs}(\text{luma}_i - \text{mean}(R)),$$

wherein deviation(R) represents a deviation value of the pixel region R, abs( ) represents an absolute value;
calculating $$X_I = \sum_{R \in \text{frame}} \text{mean}(R) \cdot \text{deviation}(R),$$

wherein $X_I$ represents a complexity estimation of a target I-frame;
calculating $\hat{C}_{target} = a \cdot X/b$, wherein $\hat{C}_{target}$ represents an adjusted complexity of the target I-frame, $a_I$ is integer and b is power of 2; and
calculating $a_I' = a_I \cdot R_{target}/R_{true}$ after the target I-frame encoding, wherein $a_I'$ represents $a_I$ of next target I-frame, $R_{target}$ represents a size of the target I-frame, $R_{true}$ represents a true size of the target I-frame;
performing a scene change detection to the original video data;
performing a video encoding rate control according to results of the video content complexity estimation and the scene change detection; and
performing a encoding loop calculation to the original video data according to a result of the video encoding rate control.

12. The method of video encoding of claim 11, wherein the target I-frame is encoded by utilizing $D_{target}$ for encoding, and $D_{target}$ represents a distortion value of the target frame.

13. The method of video encoding of claim 11, wherein steps of performing the scene change detection to the original video data comprise:

calculating $diff_i$, wherein $diff_i$ represents an absolute difference value of $i^{th}$ pixel between a current frame and a reference frame in the original video data, and i is an integer;

calculating $$mean(R) = \frac{1}{NM} \sum_{i \in R} diff_i,$$

wherein R represents N×M pixel region, mean(R) represents a mean value of the pixel region R;

calculating $$deviation(R) = \sum_{i \in R} abs(diff_i - mean(R)),$$

wherein deviation(R) represents a deviation value of the pixel region R, abs( ) represents an absolute value;

calculating $$X = \sum_{R \in frame} mean(R) \cdot deviation(R),$$

wherein X represents a complexity estimation of a target frame; and when X is greater than a critical value, the target frame is a scene change frame.

14. The method of video encoding of claim 13, wherein after calculating multiple X values, the minimum value is selected from the multiple X values for deciding the critical value.

15. The method of video encoding of claim 11, wherein the video encoding loop calculation comprises motion estimation, transform, quantization and entropy encoding.

16. The method of video encoding of claim 11, wherein MPEG dynamic video compression standard is utilized for the video encoding loop calculation.

* * * * *